(12) United States Patent
Richardson

(10) Patent No.: US 7,377,993 B2
(45) Date of Patent: May 27, 2008

(54) METHODS FOR REDUCING FLUORESCENCE IN PULP AND PAPER

(76) Inventor: Tanya Smith Richardson, 2049 Bill Johnson Dr., Vidalia, LA (US) 71373

( * ) Notice: Subject to any disclaimer, the term of this patent is extended or adjusted under 35 U.S.C. 154(b) by 191 days.

(21) Appl. No.: 10/792,023

(22) Filed: Mar. 3, 2004

(65) Prior Publication Data
US 2005/0194110 A1 Sep. 8, 2005

(51) Int. Cl.
D21C 5/02 (2006.01)

(52) U.S. Cl. .............. 162/6; 162/4; 162/5; 162/72; 162/87; 162/168.2

(58) Field of Classification Search ........... 162/4–6, 162/87, 88, 70, 148, 158, 162, 168.1, 168.2
See application file for complete search history.

(56) References Cited

U.S. PATENT DOCUMENTS

| | | | | |
|---|---|---|---|---|
| 2,958,622 A | * | 11/1960 | Sparrow | 162/71 |
| 3,354,027 A | * | 11/1967 | Hossain et al. | 162/5 |
| 4,244,777 A | * | 1/1981 | Gupta | 162/6 |
| 4,347,099 A | * | 8/1982 | De Ceuster et al. | 162/5 |
| 4,579,628 A | * | 4/1986 | Renard et al. | 162/85 |
| 5,116,746 A | | 5/1992 | Bernier et al. | |
| 5,458,736 A | * | 10/1995 | Foster | 162/7 |
| 5,529,660 A | * | 6/1996 | Kogan et al. | 162/4 |
| 5,691,193 A | | 11/1997 | Paice et al. | |
| 5,712,107 A | | 1/1998 | Nichols | |
| 5,755,926 A | * | 5/1998 | Hankins et al. | 162/6 |
| 5,770,010 A | * | 6/1998 | Jelks | 162/6 |
| 6,294,047 B1 | | 9/2001 | Chakar et al. | |
| 6,387,211 B1 | | 5/2002 | Chakar et al. | |
| 6,409,881 B1 | * | 6/2002 | Jaschinski | 162/9 |

FOREIGN PATENT DOCUMENTS

| | | | |
|---|---|---|---|
| GB | 1396139 A | * | 6/1975 |
| JP | 05-033279 | * | 2/1993 |
| JP | 11-269788 | * | 10/1999 |

OTHER PUBLICATIONS

Michel Dubreuil, Introduction to Fluorescence in Fiber Recycling, Aug. 1995, pp. 98-108.*
Brian P. Roy, How Do You Remove/Destroy/Extinguish Fluorescent Material in Deinked Pulp?, Nov. 1994, pp. 74-79.*
Dence, Carlton W., and Reeve, Douglas W., Pulp Bleaching Principles and Practice, 1996, TAPPI Press, pp. 388-389.*

* cited by examiner

*Primary Examiner*—Eric Hug
(74) *Attorney, Agent, or Firm*—Wolf, Greenfield & Sacks, P.C.

(57) ABSTRACT

Methods for reducing, and in some cases eliminating, fluorescence in pulp and paper, as well as the resulting articles, are provided. The methods destroy fluorescent activity of agents (e.g., whitening agents) which may be present in the pulp during processing. The methods are particularly applicable to recycling processes that use paper that includes fluorescent whitening agents. The methods may be used to produce recycled pulp and paper that, for example, may be suitably used in food grade applications which require no, or minimal, amount of fluorescence. In some cases, the methods also advantageously enable production of recycled pulp and paper that has reduced amounts of phosphorescence.

28 Claims, 2 Drawing Sheets

METHODS FOR REDUCING FLUORESCENCE IN PULP AND PAPER

FIELD OF INVENTION

The present invention relates generally to paper processing and more particularly to methods for reducing and, in some cases, eliminating fluorescence in pulp and paper.

BACKGROUND OF INVENTION

Paper may be formed from short, flexible fibers that are processed, for example, to form sheets. During processing, many chemicals and materials may be added to improve the properties of paper for a particular use. For example, whitening agents may be added during processing to increase the whiteness and/or brightness of the resulting paper.

Certain common whitening agents function by making use a phenomenon known as fluorescence. For example, "fluorescent whitening agents" (FWA's) can absorb light having relatively short wavelengths (e.g., ultra-violet or near ultra-violet light) and emit light having a longer wavelength (e.g., visible light). This effect leads to an increase in the apparent whiteness and/or brightness of the resulting paper. Examples of common fluorescent whitening agents include diaminostilbene compounds.

However, fluorescent whitening agents are characterized as being poisonous and/or deleterious substances by the Food and Drug Administration, in part, because they can potentially cause health problems in humans if absorbed into the body. If food is packaged with paper that includes fluorescent whitening agents, it is possible for the agents to pass from the paper to the food. As a result, federal regulations limit the content of fluorescent agents in paper products intended for contact with food (i.e., food grade paper).

The safety concerns and regulations have, in particular, limited the ability to use recycled paper in food grade applications. Recycled paper typically is processed using waste paper produced from multiple sources, many of which oftentimes include fluorescent whitening agents. Thus, it is difficult (or impossible) to prevent the presence of such whitening agents during the processing of recycled waste paper. If not eliminated, such whitening agents are incorporated into the final paper product which, as noted above, renders the product unsuitable for food grade applications.

SUMMARY OF INVENTION

The present invention is directed to methods for reducing and, in some cases, eliminating fluorescence in pulp and paper, as well as pulp and paper articles formed using the methods.

In one aspect, a method for reducing fluorescence in recycled pulp is provided. The method includes processing waste paper to form a mixture comprising pulp and fluorescent agents. The method further includes adding chlorine dioxide solution to the mixture to interact with the fluorescent agents thereby reducing fluorescent activity of the fluorescent agents.

In another aspect, a recycled pulp or paper article is provided. The article has a fluorescence component of brightness of less than about 2.0% and essentially no phosphorescence activity.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

Methods for reducing, and in some cases eliminating, fluorescence in pulp and paper, as well as the resulting articles, are provided. The methods destroy fluorescent activity of agents (e.g., whitening agents) which may be present in the pulp during processing. The methods are particularly applicable to recycling processes that use waste paper that includes fluorescent whitening agents. The methods may be used to produce recycled pulp and paper that, for example, may be suitably used in food grade applications which require no, or minimal, amount of fluorescence. In some cases, the methods also advantageously enable production of recycled pulp and paper that has reduced amounts of phosphorescence or no phosphorescent activity at all.

Figure 1:
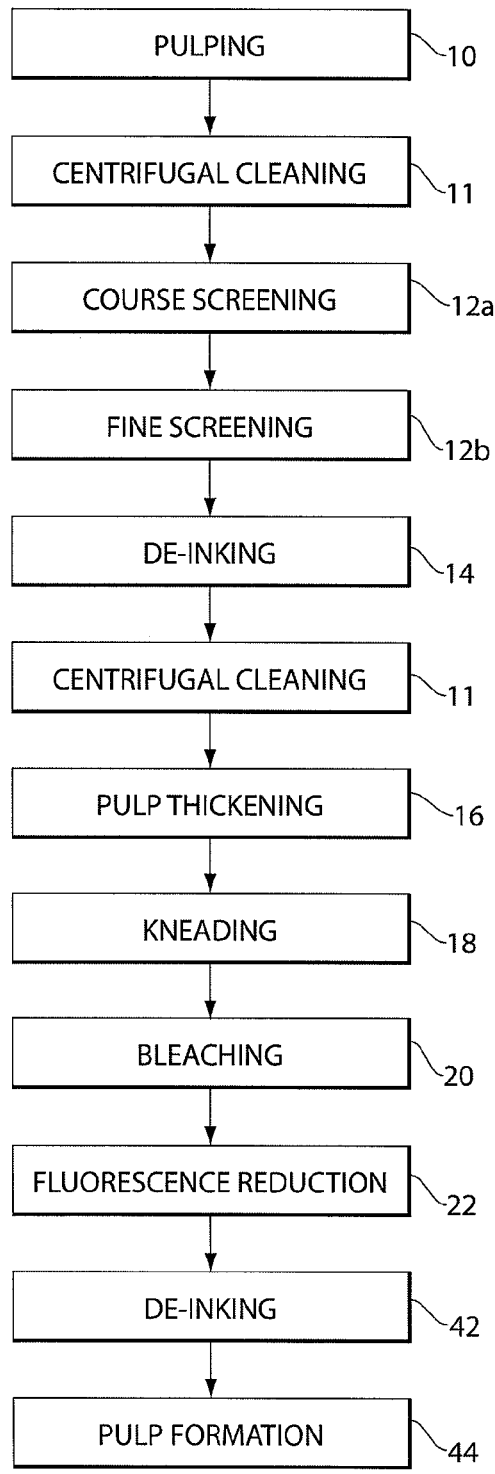
FIG. 1 is a diagram illustrating process steps of a method of producing recycled pulp with reduced fluorescence according to an embodiment of the present invention.

FIG. 1 illustrates the steps of processing recycled paper to produce recycled pulp having reduced fluorescence according to one method of the present invention. It should be understood that the present invention is not limited to these process steps and that variations to these process steps would be known to those of ordinary skill in the art and fall within the scope of this invention.

The method illustrated in FIG. 1 includes a number of conventional processing steps, as well as a bleaching and fluorescence reduction steps which have certain preferred process conditions that are described further below. The preferred process conditions cause the reduction (and, in some cases, elimination) of fluorescence and, in some processes, the reduction (and, in some cases, elimination) of phosphorescence of the resulting pulp and paper products.

The steps of the illustrative process include a number of conventional processing steps such as pulping 10, centrifugal cleaning 11, coarse screening 12a, fine screening 12b, de-inking 14, pulp thickening 16 and kneading 18 which are conducted prior to the bleaching 20 and fluorescence reduction 22 steps. After the bleaching and fluorescence reduction steps, other conventional steps include a secondary de-inking step 42 and pulp sheet formation 44. As described further below, the process steps may include several sub-steps.

It should be understood that the conditions of the conventional processing steps (e.g., pulping, screening, de-inking, pulp thickening and kneading) may differ than those described herein, or other alternative processing steps may be used, as known to those of ordinary skill in the art. Also, in certain methods of the invention, some of the processing steps may be omitted if not needed.

In the illustrative method, waste paper is used as the starting material. Waste paper includes any type of discarded paper such as white paper, types of office waste and the like. In some methods of the invention, it may be preferred to use waste paper that includes minimal amounts or no amount of ground wood (e.g., magazines and newspapers). The waste paper may be from a number of different sources and, as noted above, typically includes fluorescent agents in the form of whitening agents.

In pulping step 10, the waste paper is added to a pulper which includes water and, in most cases, chemicals. The pulper chops the waste paper into smaller pieces and begins the process of separating fibers of the paper from one another. In certain methods, the mixture is heated to enhance the separation process. If present, chemicals may also increase separation. After the pulping step, the separated fibers remain suspended in the water to form a slurry which is also referred to as a mixture. In the illustrative method, the mixture of water and fibers then passes to a series of cleaning steps. As shown in FIG. 1, the first cleaning step is a centrifugal cleaning step 11 which involves adding the pulp mixture to a centrifugal cleaning apparatus. The apparatus spins the mixture which causes components of the mixture to separate by mass. For example, the apparatus is designed so that the pulp fibers remain in one section of the apparatus. Lighter and heavier contaminants are collected in other sections of the apparatus and removed from the mixture. In certain methods of the invention, this centrifugal cleaning step may be repeated at different points during the method.

After the centrifugal cleaning step, the method shown in FIG. 1 includes a coarse screening step 12a followed by a fine screening step 12b. The coarse screening step involves removing relatively large particles (e.g., ink, plastic, glue) and other types of contaminants (e.g., staples, paper clips) from the pulp mixture. The mesh size, for example, in this screening step may be about 0.050 inches. The fine screening step removes smaller particles and other types of contaminants that may still be present in the mixture.

After screening, the illustrative method includes de-inking step 14. The purpose of the de-inking step is to remove any ink, coloring, glue and adhesive particles, as well as other types of contaminants that remain in the mixture. De-inking may involve a floatation technique in which the pulp mixture is introduced into a tank. In some methods, soap is introduced into the mixture. Gas (e.g., air) may also be introduced into the mixture. The action of the soap compounds and gas can cause the particles, and other contaminants, to separate from the other components of the mixture (e.g., fibers) and to rise to the top of the mixture. The floating particles and contaminants may be physically removed, for example using a paddle, and discarded. The pulp mixture may be recovered.

Following de-inking, the method shown in FIG. 1 includes an additional centrifugal cleaning step 11 similar to the one described above.

The next step in the illustrative method is pulp thickening step 16. This step may involve, for example, passing the mixture over a screen which results in a portion of the water falling through holes in the screen and, thus, being removed from the mixture. The resulting pulp mixture has an increased consistency (i.e., weight percentage fiber). For example, the consistency of the mixture may be between about 35% and about 45% and, in some cases, about 40%, after this step.

Following the pulp thickening step, the illustrative method includes a kneading step 18 which mechanically reduces the size of contaminant (e.g., glue and ink) particles and may disassociate the particles from the pulp.

Prior to the bleaching step 20, process conditions may be adjusted to be within preferred ranges in certain methods of the invention. For example, in certain methods, it is preferable to adjust the pH of the mixture to be between about 11.0 and about 11.4 prior to bleaching, and, in some cases, to be about 11.2. The pH of the mixture may be adjusted prior to bleaching to account for the reduction in pH that occurs during the bleaching step so as to ensure that the mixture has a pH within a desired range in the subsequent fluorescence reducing step. It has been determined that, in certain methods of the invention, the effectiveness of the fluorescence reducing step is increased when the pulp mixture has a pH within a certain range, as described further below.

Because the pH of the mixture prior to this adjustment is generally below 11.0, this pH adjustment step typically involves adding a base (e.g., NaOH) to the pulp mixture at appropriate concentration and levels to increase the pH to a desired value. It should be understood that certain methods of the invention may not utilize a pH adjustment, for example, if the pH of the pulp mixture is at a desired value such as within one of the preferred ranges noted above.

Also, in certain methods of the invention, it may be desirable to adjust the temperature of the pulp mixture to be within a preferred range prior to the bleaching step. The temperature is adjusted to provide desirable conditions for the reactions that occur in the bleaching step. In some cases, the temperature of the pulp mixture is adjusted to be greater than about 200 degrees F. and less than about 230 degrees F. (e.g., about 220 degrees F.). The temperature may be adjusted, for example, by injecting steam into the mixture. It should be understood that the pulp mixture is maintained at elevated pressures so that the water in the mixture generally may be maintained in a liquid state even at temperatures approaching, or above, the boiling point of water.

In some of the methods when conditions are adjusted prior to bleaching, certain conditions may be adjusted in the kneading step. For example, the pH of the mixture may be adjusted by introducing a base (e.g., NaOH) in the kneading step. Other conditions may be adjusted after the kneading step and prior to bleaching. For example, as shown in the process flow diagram of FIG. 2, the temperature of the mixture may be adjusted by introducing steam into the mixture between kneading and bleaching. It should be understood that the location of where the conditions are adjusted may vary in different methods of the invention.

Figure 2:
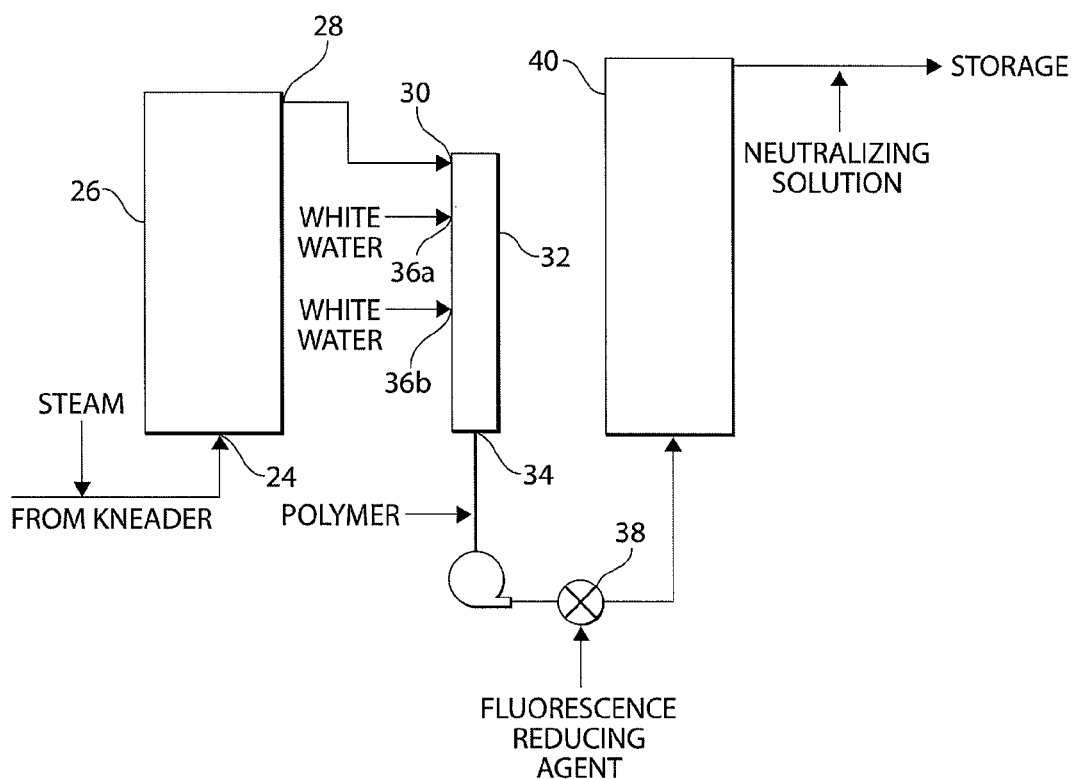
FIG. 2 is a process flow diagram of the bleaching and fluorescence reduction steps of according to an embodiment of the present invention.

FIG. 2 is a process flow diagram of the bleaching and fluorescence reduction steps according to certain methods of the present invention. As shown schematically in FIG. 2, the pulp mixture may be introduced through an inlet 24 at the base of a peroxide tower 26. In the illustrative method, the mixture is pumped in an upward direction to an outlet 28 at the top of the tower. A bleaching agent is introduced into the mixture in the tower which reacts with lignin, a pulp component, that leads to an increase in the brightness of the pulp and resulting paper. In some methods, hydrogen peroxide is the preferred bleaching agent, though it should be understood that other bleaching agents known in the art may also be used. Typically, the bleaching agent (e.g., hydrogen peroxide) is introduced into the mixture at a location near the base of the tower to permit sufficient reaction time between the agent and the lignin.

In some methods of the invention, it may be preferred to control the flow rate of the bleaching agent in order to reduce the amount of un-reacted, residual bleaching agent in the mixture at the outlet of the peroxide tower. In some methods, residual bleaching agent may decrease the effectiveness of the subsequent fluorescence reducing step. The flow rate of the bleaching agent may be controlled, using a flow controller, in relation to the flow rate of the pulp mixture through the tower.

After the bleaching step, the outlet of the peroxide tower is connected to an inlet 30 of a stand pipe 32 according to the illustrative embodiment of the invention shown in FIG. 2. The pulp mixture is pumped through the stand pipe to an outlet 34. Water may be injected into the mixture through other inlets 36a, 36b to the stand pipe, for example, to reduce consistency of the mixture, as described further below. If desired, it is also possible to introduce other chemicals into the mixture through the inlets.

In the illustrative method, the mixture is subjected to the fluorescence reduction step after passing through the outlet of the stand pipe. It should be understood that some methods of the invention may not use a stand pipe. For example, in some methods, the fluorescence reduction step may immediately follow the bleaching step.

As noted above, in certain methods, the pH of the mixture is within a preferred range at the onset of, and during, the fluorescence reduction step. For example, in these methods, it may be desired for the pH to be between about 9.8 and about 10.4 during the fluorescence reduction step. In some methods, it may be desired for the pH to be about 10.2. Such pH values increase the efficiency of the fluorescence reduction step by providing favorable conditions for the reaction between fluorescence reduction agents and the fluorescence whitening agents, as described further below. As described above, the pH may be adjusted upstream of the bleaching process while accounting for the pH reduction during the bleaching process to provide the desired pH ranges for the fluorescence reduction step without further adjustment after bleaching. In some cases, however, the pH may be adjusted after bleaching and prior to fluorescence reduction to provide the desired value.

In certain methods, the consistency of the mixture is within a preferred range at the onset of, and during, the fluorescence reduction step. For example, the consistency of the mixture may be between about 8% and about 12% and, in some cases, about 10%. To reach these ranges, the consistency is typically reduced from that prior to, and during, the bleaching process. The consistency may be decreased, by adding water to the mixture after bleaching, for example, in the stand pipe as described above.

In the illustrative embodiment, the fluorescence reduction step involves introducing polymeric material into the pulp mixture. Suitable polymeric materials may include cationic polymers such as certain suitable diallylammonium polymeric compounds and/or cyclopolymers (e.g., quaternary ammonium cyclopolymers). In some methods of the invention, poly(diallyldimethylammonium) chloride is used as the polymeric material. A suitable poly(diallyldimethylammonium) chloride is commercially available from Buckman Laboratories (Memphis, Tenn.; www.buckman.com) under the name Bufloc 5140. It should be understood that other polymeric materials may also be suitable.

In some cases, the polymeric material may be in the form of a solution (e.g., water-based) or an emulsion (e.g., water-based). The weight percentage of polymeric material in the solution or emulsion, for example, may be between about 10% and about 50% (e.g., about 40%). The total amount of polymeric material may be added in amounts between about 0.1 weight percent and about 1.0 weight percent based on the total weight of the pulp mixture. In some cases, the polymeric material may be added in amounts between about 0.2 weight percent and about 0.6 weight percent based on the total weight of the pulp mixture.

It should be understood that other weight percentages of polymeric materials in the solution or emulsion, as well as other total amounts of polymeric material in the pulp mixture may also be suitable. Also, the polymeric material may be added to the pulp mixture in forms other than a solution or an emulsion.

The introduction of polymeric material into the mixture is an optional step and some methods of the invention do not involve introducing polymeric material into the pulp mixture.

The fluorescence reduction step also involves introducing a fluorescence reducing agent into the pulp mixture. In certain methods of the invention, the preferred fluorescence reducing agent is chlorine dioxide which typically is dissolved in water to form a solution. However, in some methods of the invention, other suitable fluorescence reducing agents may also be used including other chlorine-based compounds/solutions, chlorine gas or ozone.

In the illustrative method, the fluorescence reducing agent is introduced into the mixture in a mixing device 38 and the polymeric material is introduced into the mixture upstream of the mixing device. The mixing device ensures that the fluorescence reducing agent and the polymeric material are distributed uniformly throughout the mixture. Though, in some methods of the invention, a mixing device is not used.

In certain methods of the invention, the fluorescence reducing agent is added to the mixture shortly after the polymeric material is added. For example, the fluorescence reducing agent may be added within one minute, or even within 10 seconds, after the addition of the polymeric material. However, it should be understood that the fluorescence reducing agent may be added for longer periods of time after the polymeric material is added. Also, in certain methods of the invention, the fluorescence reducing agent may be added to the mixture simultaneous with, or prior to, the polymeric material.

It has been discovered that the concentration of the fluorescence reducing agent is an important factor in certain methods of the invention. In these methods, it may be preferred to add the fluorescence reducing agent within certain concentration ranges. For example, when chlorine dioxide solution (water-based) is used as the fluorescence reducing agent, the concentration of the solution may preferably be between about 1.0 grams (chlorine dioxide) per liter (water) and about 3.0 grams per liter. In some cases, the concentration of the chlorine dioxide solution is preferably between about 2.0 and about 2.4 grams per liter; and in other cases, preferably about 2.2 grams per liter. Concentrations within the above-noted ranges have been found to be particularly effective in reducing the amount of fluorescence.

The fluorescence reducing agent functions by reacting with the fluorescent agents (e.g., whitening agents) present in the slurry thereby destroying their fluorescent activity. Without being bound to any theory, it is believed that the fluorescence reducing agent destroys the phenolic bond present in many types of fluorescent agents. When introduced into the pulp mixture, the polymeric material may enhance the ability of the fluorescence reducing agent to perform this function.

The reaction between the fluorescence reducing agent and the fluorescent agents begins when the reducing agent is introduced into the mixture. As shown in the illustrative method of FIG. 2, after the mixing device, the mixture is pumped into a tower 40 to provide additional residence time for the reaction between fluorescence reducing agent and the fluorescent agents.

In some methods, the fluorescence reducing agent may provide the additional benefit of reacting with any phosphorescent agents that may be in the pulp mixture. In this manner, the phosphorescent activity of these agents may be destroyed. When introduced into the pulp mixture, the polymeric material may further limit the phosphorescent activity of these agents.

In certain methods of the invention, a neutralizing solution may be added to the pulp mixture at, or near, an outlet of the tower. The neutralizing solution is designed to counteract the effect of the fluorescence reducing agent on the oxidation reduction potential (ORP) of the pulp mixture. As known to those of ordinary skill in the art, ORP is a measure of the ability of a solution (or mixture) to oxidize or reduce species in the mixture. It has been determined that it is preferable in certain methods of the present invention for the ORP of the mixture to be approximately equal to or less than 0 (i.e., neutral or negative). For example, it may be preferable for the ORP to be between about 0 and about −200; or, between about 0 and −50. The effectiveness of the fluorescence reducing step is enhanced when the ORP is within the above ranges. It should be understood that ORP may be measured according to known techniques and instruments.

Because chlorine dioxide (and most other suitable fluorescence reducing agents) have a positive ORP, the neutralizing solution used in methods of the invention typically has a negative ORP. In general, any suitable solution capable of reacting with residual oxidizing species in the mixture may be used. In some methods, a preferred neutralizing solution is sodium bisulfite. The neutralizing solution is added in amounts such that the mixture has the desired ORP. In some methods, a flow controller is used to control the flow of the neutralizing solution so as to add the appropriate amount.

It should be understood that if the mixture has a desired ORP after the introduction of the fluorescent reducing agent, then it may not be necessary to add a neutralizing solution.

The fluorescence reduction step is generally concluded after the fluorescence reducing agents have completely reacted (or reacted to a sufficient extent) with the fluorescent agents in the mixture and, if desired, the ORP of the mixture is adjusted. In the illustrative method, the pulp mixture is then transferred to a storage tank which is followed by a secondary de-inking step 42 that includes the floatation and cleaning steps described above.

After the secondary de-inking step, the pulp mixture is converted into a pulp sheet in a pulp sheet formation step 44 that uses conventional techniques. In the illustrative method, the pulp sheet formation step uses a wet lap step.

In some cases, the pulp sheet is formed by one manufacturer and then may be shipped to another manufacturer that processes the pulp sheet to form a paper sheet and/or other types of paper products. In other cases, the pulp sheet may be directly processed by the same manufacturer to form a paper sheet and/or other types of paper products.

Conventional processes may be used to convert the pulp sheet produced according to methods of the invention to paper. The processes generally involve re-dispersing the pulp to form a water-based mixture. In some cases, the recycled pulp of the invention may be mixed with virgin pulp to provide enhanced strength and/or smoothness. The pulp mixture may include other chemicals (non-fluorescent agents) to provide the resulting paper with desirable properties. In typical processes, the mixture may be sprayed through a nozzle and onto a moving wire screen which enables water from the mixture to drain. A sheet is formed on the wire screen which may be subsequently be transferred to presses and rollers. Eventually, a paper sheet is obtained.

As described above, the methods of the invention can reduce and, in some cases, eliminate the amount of fluorescence in pulp and paper. In some cases, the methods may produce pulp and paper having substantially zero fluorescence. That is, the pulp and paper produced according to the methods of the invention may exhibit no fluorescent activity which may be quantified as described further below. However, it should be understood, that other methods of the invention may produce pulp and paper having small amounts of fluorescent activity that are reduced as compared to recycled pulp and paper products that are produced using conventional techniques that do not include a fluorescence reduction step.

Fluorescent activity may be quantified by measuring the fluorescent component of brightness of pulp or paper using known techniques. One suitable technique for measuring the fluorescent component of brightness is described in Technical Association of the Pulp and Paper Industry (TAPPI) test method T 452 om-02, entitled "Brightness of Pulp, Paper, and Paperboard". This test method generally involves comparing the brightness of light reflected from a paper or pulp sample when UV and visible light are used as incident light to the brightness of light reflected from the sample when only visible light is used as incident light. The incident light that includes a UV component may generate fluorescence, while the incident light that includes only visible light does not generate fluorescence. The difference between the brightness measured using visible and UV incident light and the brightness measured using visible light is equal to the fluorescent component of brightness. Suitable instruments for measuring the fluorescent component of brightness include, for example, Brightimeter Model S4-M, Brightimeter Model Micro S-5, and PROFILE/Plus Brightness™, which are manufactured by Technidyne Corporation (New Albany, Ind.; www.technidyne.com).

In some cases, paper or pulp produced according to the invention may have a fluorescent component of brightness of less than about 2.0%, less than about 1.0%, or less than about 0.2%. In some cases, the fluorescent component of brightness may be too small to be measured and/or equal to 0%.

Also, in some cases, the methods may produce pulp and paper having substantially zero phosphorescence. That is, the pulp and paper produced according to the methods of the invention may exhibit essentially no phosphorescent activity. However, it should be understood, that other methods of the invention may produce pulp and paper having small amounts of phosphorescence.

The amount of phosphorescence may be characterized, for example, by a visual test in which the pulp or paper sample is exposed to a UV light to assess the amount of glow. In some cases, the pulp or paper produced according to methods of the invention exhibits essentially no glow using the visual test which means that the pulp or paper has essentially no phosphorescent activity.

The pulp and paper produced according to methods of the invention may be used to form a variety of articles. As noted above, one particularly preferred area of use for the pulp and paper of the invention is in food grade applications because the pulp and paper can meet regulations that limit the content of fluorescent agents in paper products intended for contact with food. It should be understood, however, that the pulp and paper may be used to form a variety of products including products that are used outside the area of food grade applications.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of reducing fluorescence in recycled pulp comprising:
    processing waste paper to form a mixture comprising pulp and fluorescent agents;
    adding polymeric material to the mixture;
    adding chlorine dioxide solution to the mixture to interact with the fluorescent agents thereby reducing fluorescent activity of the fluorescent agents; and
    adjusting the oxidation reduction potential of the mixture to a value of less than or equal to zero after the step of adding chlorine dioxide solution.

2. The method of claim 1, wherein the chlorine dioxide solution is added to the mixture after the polymeric material is added to the mixture.

3. The method of claim 2, wherein the chlorine dioxide solution is added to the mixture within a period of time of less than 1 minute after the polymeric material is added to the mixture.

4. The method of claim 1, further comprising adjusting the pH of the mixture to a value between about 9.8 and about 10.4 prior to adding the chlorine dioxide solution to the mixture.

5. The method of claim 1, further comprising adjusting the pH of the mixture to a value of about 10.2.

6. The method of claim 1, further comprising adjusting the consistency of the mixture to be between about 8% and about 12% prior to adding the chlorine dioxide solution to the mixture.

7. The method of claim 1, further comprising adjusting the consistency of the mixture to be about 10% prior to adding the chlorine dioxide solution to the mixture.

8. The method of claim 1, comprising adding chlorine dioxide solution in a concentration of between about 1.0 grams/liter and about 3.0 grams/liter to the mixture.

9. The method of claim 1, comprising adding chlorine dioxide solution in a concentration of between about 2.0 grams/liter and about 2.4 grams/liter to the mixture.

10. The method of claim 1, comprising adjusting the oxidation reduction potential of the mixture to a value of between about 0 and about −200.

11. The method of claim 1, wherein the oxidation reduction potential is adjusted by adding a neutralizing solution to the pulp mixture.

12. The method of claim 11, wherein the neutralizing solution is sodium bisulfite.

13. The method of claim 1, further comprising processing the pulp mixture after adding the chloride dioxide solution to form a pulp sheet.

14. The method of claim 13, wherein the pulp sheet has a fluorescence component of brightness of less than about 2.0%.

15. The method of claim 13, wherein the pulp sheet has a fluorescence component of brightness of substantially zero.

16. The method of claim 13, wherein the pulp sheet has essentially no phosphorescence activity.

17. The method of claim 13, further comprising processing the pulp sheet to form paper.

18. The method of claim 17, wherein the paper has a fluorescence component of brightness of less than about 2.0%.

19. The method of claim 17, wherein the paper has a fluorescence component of brightness of substantially zero.

20. The method of claim 17, wherein the paper has essentially no phosphorescence activity.

21. The method of claim 17, wherein the paper is suitable for use in a food grade application.

22. The method of claim 1, wherein the fluorescent agents are whitening agents.

23. A method of reducing fluorescence in recycled pulp comprising:
    processing waste paper to form a mixture comprising pulp and fluorescent agents;
    adding a bleaching agent to the mixture in a bleaching step prior to adding the chlorine dioxide solution to the mixture;
    adding chlorine dioxide solution to the mixture to interact with the fluorescent agents thereby reducing fluorescent activity of the fluorescent agents; and
    adjusting the oxidation reduction potential of the mixture to a value of less than or equal to zero after the step of adding chlorine dioxide solution.

24. The method of claim 23, wherein the bleaching agent is hydrogen peroxide.

25. The method of claim 23, further comprising controlling the flow rate of the bleaching agent added to the mixture in the bleaching step such that the concentration of the bleaching agent is substantially zero after the bleaching step.

26. The method of claim 23, further comprising controlling the temperature of the mixture to be greater than about 200 degrees F. and less than 230 degrees F. in the bleaching step.

27. The method of claim 23, further comprising adjusting the pH of the mixture to be between about 11.0 and 11.4 at the start of the bleaching step.

28. The method of claim 27, further comprising adjusting the pH of the mixture to be about 11.2 at the start of the bleaching step.

* * * * *